United States Patent
Hwang et al.

(10) Patent No.: US 9,142,812 B2
(45) Date of Patent: Sep. 22, 2015

(54) BATTERY PACK

(71) Applicant: Samsung SDI Co., Ltd., Yongin-si, Gyeonggi-do (KR)

(72) Inventors: Yu-Sik Hwang, Yongin-si (KR); Jae-Seung Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 196 days.

(21) Appl. No.: 13/627,833

(22) Filed: Sep. 26, 2012

(65) Prior Publication Data
US 2013/0194771 A1    Aug. 1, 2013

Related U.S. Application Data

(60) Provisional application No. 61/593,163, filed on Jan. 31, 2012.

(51) Int. Cl.
*H05K 9/00* (2006.01)
*H01M 2/00* (2006.01)
(Continued)

(52) U.S. Cl.
CPC .......... *H01M 2/1061* (2013.01); *H01M 2/0215* (2013.01); *H01M 10/425* (2013.01); *H01M 10/4257* (2013.01); *H01M 2220/30* (2013.01)

(58) Field of Classification Search
CPC .................................. H05K 9/00; H01M 2/00
USPC ......... 361/818, 777, 704–722, 752–753, 760, 361/807, 829; 429/7
See application file for complete search history.

(56) References Cited

U.S. PATENT DOCUMENTS 6,600,243 B1 *  7/2003  Hara et al. ..................... 307/150
7,456,614 B2 * 11/2008  Sato et al. ...................... 320/134
(Continued)

FOREIGN PATENT DOCUMENTS

JP    2000-077831         3/2000
JP    2004-185861 A       7/2004
(Continued)

OTHER PUBLICATIONS

Office Action dated Aug. 30, 2013 for corresponding KR Application No. 10-2012-0119286.
(Continued)

*Primary Examiner* — Courtney Smith
*Assistant Examiner* — Rashen E Morrison
(74) *Attorney, Agent, or Firm* — Knobbe, Martens, Olson & Bear LLP

(57) ABSTRACT

A battery pack providing power to a portable electronic device is disclosed which inhibits electromagnetic waves generated by the battery pack from interfering with the portable electronic device. The portable electronic device may include a radiofrequency (RF) circuit including a transceiver. The battery pack may include a battery cell and a protection circuit module (PCM) which operates to prevent the battery cell from overcharge/overdischarge and overheating. The PCM may include a substrate and a protection device mounted to the substrate. Electromagnetic waves generated when the protection device operates are shielded from the portable electronic device by a shielding layer formed on the substrate of the PCM. The substrate may include a plurality of circuit layers, each including a circuit layer, with the circuit layers in electrical communication with one another. A shielding pattern is formed on at least one of the circuit layers.

17 Claims, 5 Drawing Sheets

(51) Int. Cl.
*H01M 2/10* (2006.01)
*H01M 2/02* (2006.01)
*H01M 10/42* (2006.01)

(56) References Cited

U.S. PATENT DOCUMENTS

| | | | | |
|---|---|---|---|---|
| 7,479,758 | B2* | 1/2009 | Moon | 320/112 |
| 7,667,979 | B2* | 2/2010 | Yun | 361/777 |
| 7,692,405 | B2* | 4/2010 | Kim et al. | 320/134 |
| 8,031,122 | B2* | 10/2011 | Jang et al. | 343/700 MS |
| 8,514,135 | B2* | 8/2013 | Jang et al. | 343/700 MS |
| 8,697,264 | B2* | 4/2014 | Park et al. | 429/7 |
| 8,715,842 | B2* | 5/2014 | Lee et al. | 429/7 |
| 2002/0039283 | A1* | 4/2002 | Nakamura et al. | 361/736 |
| 2005/0208345 | A1* | 9/2005 | Yoon et al. | 429/7 |
| 2006/0091851 | A1* | 5/2006 | Kim | 320/112 |
| 2006/0115715 | A1* | 6/2006 | Ge et al. | 429/97 |
| 2006/0246349 | A1* | 11/2006 | Uh | 429/175 |
| 2007/0154784 | A1* | 7/2007 | Seo | 429/61 |
| 2007/0154785 | A1* | 7/2007 | Seo et al. | 429/61 |
| 2007/0202364 | A1* | 8/2007 | Uh et al. | 429/7 |
| 2008/0008910 | A1* | 1/2008 | Koh | 429/7 |
| 2008/0102368 | A1* | 5/2008 | Sumida et al. | 429/178 |
| 2008/0171235 | A1* | 7/2008 | Seo et al. | 429/7 |
| 2008/0176134 | A1* | 7/2008 | Kim | 429/175 |
| 2008/0292913 | A1* | 11/2008 | Hong et al. | 429/7 |
| 2008/0292955 | A1* | 11/2008 | Byun et al. | 429/163 |
| 2009/0197153 | A1* | 8/2009 | Fujikawa et al. | 429/82 |
| 2010/0143753 | A1 | 6/2010 | Kim et al. | |
| 2010/0143793 | A1* | 6/2010 | Yamamoto | 429/175 |
| 2013/0194771 | A1* | 8/2013 | Hwang et al. | 361/818 |

FOREIGN PATENT DOCUMENTS

| | | |
|---|---|---|
| JP | 2008-277965 | 11/2008 |
| KR | 10-2004-0037547 A | 5/2004 |
| KR | 10-2010-0066791 A | 6/2010 |
| KR | 10 2010 0071647 | 6/2010 |

OTHER PUBLICATIONS

Korean Notice of Allowance dated Jul. 30, 2014 for Korean Patent Application No. KR 10-2012-0119286 which claims priority from U.S. Appl. No. 61/593,163, filed Jan. 31, 2012, and captioned U.S. Appl. No. 13/627,833, and cites the above-identified references numbered 2-3.

* cited by examiner

BATTERY PACK

CROSS-REFERENCE TO RELATED APPLICATIONS

This application claims the benefit of priority of U.S. Provisional Application No. 61/593,163, filed on Jan. 31, 2012, entitled "BATTERY PACK", the entire contents of which are incorporated by reference.

BACKGROUND

1. Field

One or more embodiments of the present disclosure relate to a battery pack.

2. Description of the Related Art

Unlike primary batteries that cannot be charged, secondary batteries can be charged and discharged and are widely used not only in small high-tech electronic devices including mobile phones, personal digital assistants (PDAs), notebook computers, or the like, but also in energy storage systems.

As described above, in a case where a secondary battery is used as a power source of an electronic device, it is required to design the electronic device and the secondary battery so as to allow them to stably exhibit functions of their configuring elements without physical and electrical interferences between the configuring elements forming the electronic device and the configuring elements forming the secondary battery.

SUMMARY

In an embodiment, a battery pack is provided. The battery pack comprises a battery cell and a protection circuit module (PCM) in electrical communication with the battery cell.

The PCM may comprise a plurality of circuit layers that each include respective circuit patterns. At least one of the circuit patterns is a shielding pattern that shields at least a portion of electromagnetic waves generated by the protection circuit module.

The PCM further comprises a substrate including the plurality of circuit layers and a protection device mounted to the substrate that outputs a control signal to monitor charging of the battery cell and controls charging and discharging of the battery cell. The shielding pattern shields at least a portion of electromagnetic waves generated by operation of the protection device from being emitted outside of the battery pack.

The shielding pattern may be positioned between the protection device and an outer surface of the battery pack.

The battery pack may further comprise a first circuit layer including a first shielding pattern. At least a portion of the first shielding pattern may overlap the protection device in a direction out of the plane of the first circuit layers.

The first shielding pattern may extend over an area greater than a lateral dimension of a portion of the protection device that generates the electromagnetic waves.

The battery pack may also comprise a second circuit layer including a plurality of second shielding patterns. At least one of the first and second shielding patterns may overlap in a direction out of the planes of the first and second circuit layers.

The plurality of second shielding patterns may comprises two second shielding patterns, with each second shielding pattern positioned at a respective end of the second circuit layer.

The first and second shielding patterns may be positioned adjacent to the protection device.

The first and second circuit layers are may be electrically connected.

The battery pack may additionally comprise third and fourth circuit layers interposed between the first and second circuit layers. A hole may be formed in each of the third and fourth circuit layers and the first and second circuit layers may be electrically connected by a current path formed by the first shielding pattern, the holes in the third and fourth circuit layers, and the plurality of second shielding patterns.

The first shielding pattern may extends over at least an area corresponding to position of the protection device, the plurality of second shielding patterns, and the holes in the third and fourth layers.

The plurality of second shielding patterns may be exposed outside of the substrate.

The battery pack may further comprise a plurality of connection members that separate the protection circuit module and the battery cell.

The battery pack may also comprise a safety device mounted to the substrate. At least one of the protection circuit module and the safety device may be positioned between the protection circuit module and the battery cell.

The protection circuit module may be positioned adjacent to a cap plate sealing the battery cell.

The battery pack may additionally comprise a plurality of connection members interposed between the protection circuit module and the battery cell. The second shielding patterns may be electrically connected to the cap plate by the connection members.

In another embodiment, an electronic device is provided. The electronic device comprises a battery pack that supplies electrical power to the electronic device and a transceiver. The battery pack includes a plurality of circuit layers that each include respective circuit patterns, wherein at least one of the circuit patterns is a shielding pattern that shields at least a portion of electromagnetic waves generated by the battery cell from the transceiver.

The electronic device may further comprise a protection circuit module (PCM) that generates electromagnetic waves in operation.

The PCM may include the plurality of circuit layers.

The electronic device may also comprise a first circuit layer and a plurality of second circuit layers. The first and second circuit layers may overlap in a direction out of the plane of the first and second circuit layers.

The electronic device may additionally comprise a first circuit layer and a second circuit layer. The plurality of second shielding patterns may comprise at least two shielding patterns positioned at respective ends of the second circuit layer.

The first and second circuit layers may be electrically connected.

DETAILED DESCRIPTION

Reference will now be made in detail to embodiments, examples of which are illustrated in the accompanying drawings. The present disclosure may, however, be embodied in many different forms and should not be construed as being limited to the embodiments set forth herein. Rather, these embodiments are provided so that this disclosure will be thorough and complete and will fully convey the disclosed concepts to those skilled in the art, and the present disclosure will only be defined by the appended claims. Throughout the specification, a singular form may include plural forms, unless there is a particular description contrary thereto. Also, terms such as "comprise" or "comprising" are used to specify existence of a recited form, a number, a process, operations, a component, and/or groups thereof, not excluding the existence of one or more other recited forms, one or more other numbers, one or more other processes, one or more other operations, one or more other components and/or groups thereof. While terms "first" and "second" are used to describe various components, it is obvious that the components are not limited to the terms "first" and "second". The terms "first" and "second" are used only to distinguish between each component.

Figure 1:
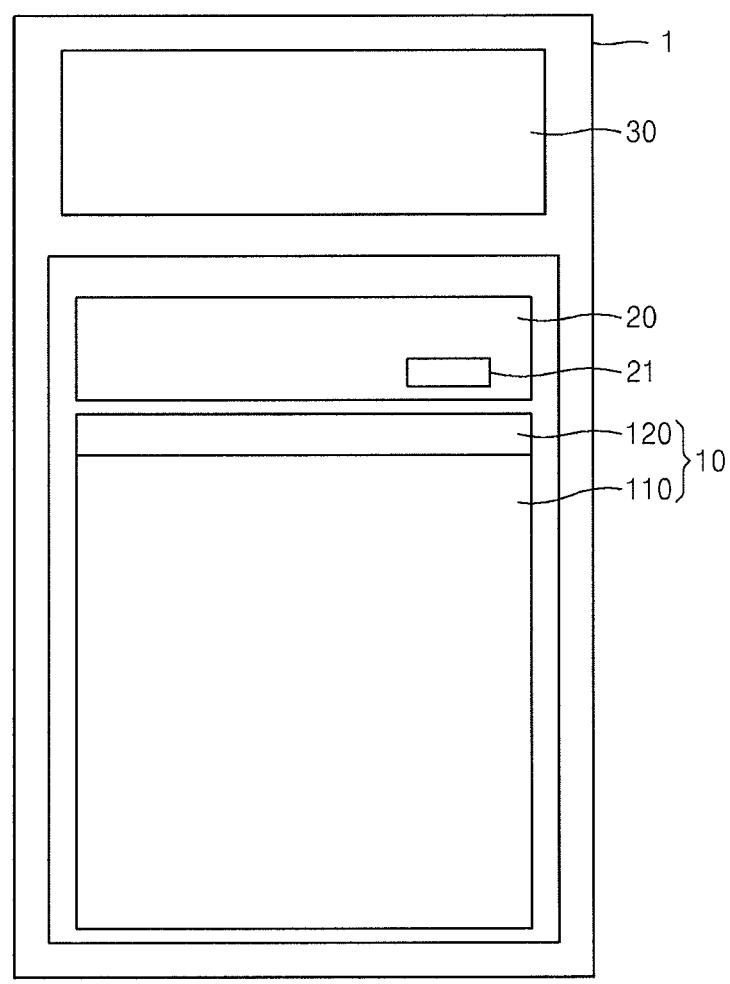
FIG. 1 is a diagram schematically illustrating a relation between configuring elements forming a battery pack and configuring elements forming a mobile device, when the battery pack is used as a power source of the mobile device including a mobile phone or the like, according to an embodiment of the present disclosure.

FIG. 1 is a diagram schematically illustrating a relation between configuring elements forming a battery pack 10 and configuring elements forming an electronic device (e.g., a mobile device 1), when the battery pack 10 is used as a power source of the mobile device 1 including a mobile phone or the like, according to an embodiment of the present disclosure.

Referring to FIG. 1, the battery pack 10 according to the present embodiment may be embedded in the mobile device 1 or may be detachable from the mobile device 1. The battery pack 10 may include a battery cell 110 and a protection circuit module (hereinafter, referred to as 'PCM') 120. The mobile device 1 may include a radio frequency (RF) circuit unit 20 including an antenna transceiving unit 21, and a signal processing unit 30.

The RF circuit unit 20 includes the antenna transceiving unit 21 that receives a wireless signal from a base station or transmits a signal, which is generated by the mobile device 1, to the base station. The signal processing unit 30 may process and control operations of the mobile device 1, thereby informing a user of contents related to the wireless signal based on the wireless signal received via the antenna transceiving unit 21, or processing an input from the user and then transmitting the input to the RF circuit unit 20.

The antenna transceiving unit 21 included in the RF circuit unit 20 may be affected by a protection device mounted in the PCM 120 included in the battery pack 10. For example, a transceiving function of the antenna transceiving unit 21 may deteriorate due to electromagnetic waves generated by the protection device mounted in the PCM 120.

Also, in a case where an operation of the battery pack 10 is not smooth, e.g., when a flow of current flowing in the PCM 120 is impeded due to a large resistance in the PCM 120, the transceiving function of the antenna transceiving unit 21 that is adjacent to the battery pack 10 may also deteriorate.

In order to solve the aforementioned problems, a pattern to shield electromagnetic waves is formed in the PCM 120 of the battery pack 10, and by decreasing a resistance of a path wherein current flows, an effect that affects the antenna transceiving unit 21 due to the battery pack 10 is minimized. Hereinafter, structures of the PCM 120 and the battery pack 10 having the aforementioned functions will now be described with reference to FIGS. 2 through 6.

Figure 2:
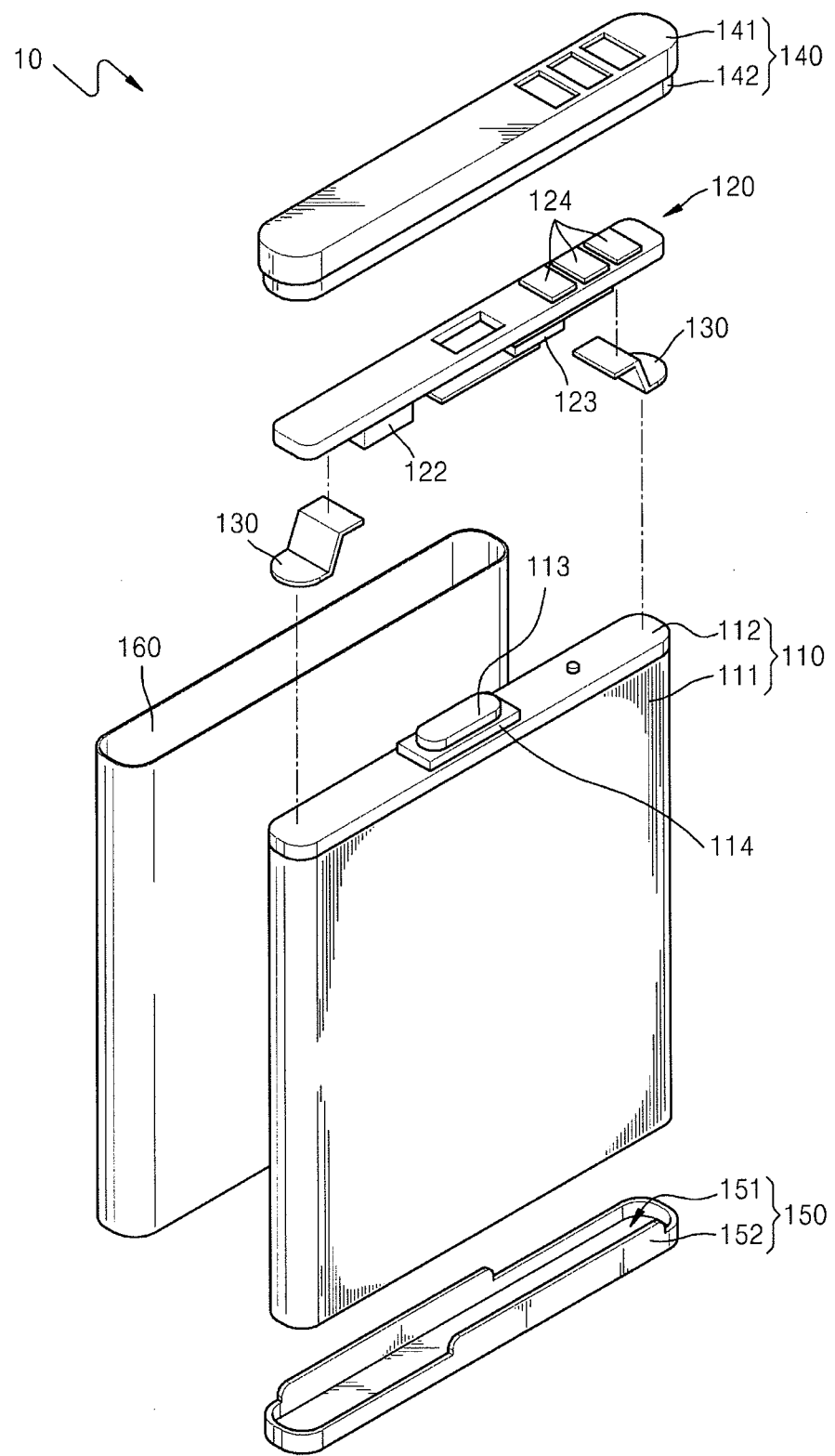
FIG. 2 is an exploded perspective view of the battery pack according to an embodiment of the present disclosure.
Figure 3:
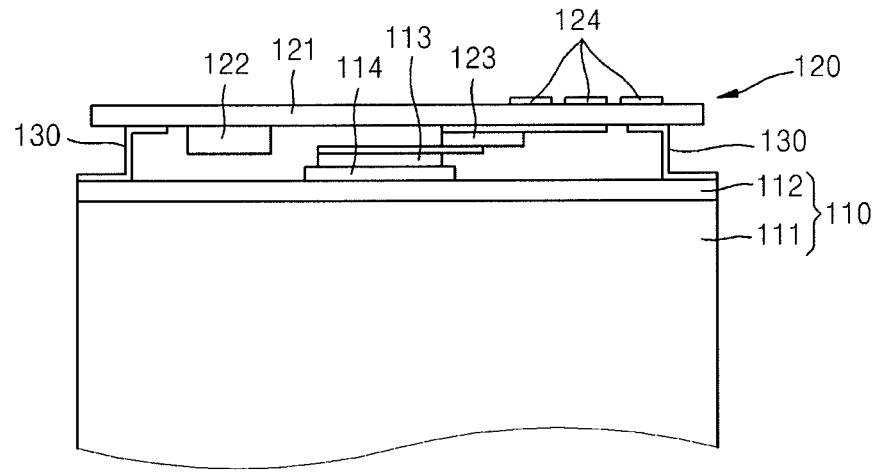
FIG. 3 is a cross-sectional side view of a battery cell and a protection circuit module (PCM) that is extracted from the battery pack.

FIG. 2 is an exploded perspective view of the battery pack 10 according to an embodiment of the present disclosure, and FIG. 3 is a cross-sectional side view of the battery cell 110 and the PCM 120 that are extracted from the battery pack 10.

Referring to FIG. 2, the battery pack 10 may include the battery cell 110, the PCM 120, connection members 130, an upper cover 140, a lower cover 150, and a label 160.

The battery cell 110 supplies electric energy. The battery cell 110 may include an electrode assembly (not shown), a can 111 internally accepting the electrode assembly and an electrolyte, and a cap plate 112 sealing an open end of the can 111. The electrode assembly includes a negative electrode plate (not shown) coated with a negative active material, a positive electrode plate (not shown) coated with a positive active material, and a separator (not shown) interposed between the negative electrode plate and the positive electrode plate. The electrode assembly in the shape of a jelly roll may be formed by rolling the negative electrode plate, the positive electrode plate, and the separator.

The electrode assembly may be accepted in the can 111 while the electrolyte is absorbed into the electrode assembly. The open end of the can 111 may be sealed by the cap plate 112 and thus may prevent a leakage of the electrolyte. The cap plate 112 and the can 111 may be coupled by laser welding.

The can 111 and the cap plate 112 are formed of a metal material, and an electrode terminal 113 having a projected shape with respect to the cap plate 112 is formed above the cap plate 112. For example, the electrode terminal 113 may be disposed in a central region of the cap plate 112, and a gasket 114 that is an insulating material may be disposed between the electrode terminal 113 and the cap plate 112.

The can 111 and the cap plate 112 may function as a terminal, e.g., a positive terminal of the battery cell 110. In this case, the electrode terminal 113 having the projected shape with respect to the cap plate 112 may function as a negative terminal. In the present embodiment, the electrode terminal 113 functions as a negative electrode, and the can 111 and the cap plate 112 each function as a positive electrode. However, it is obvious that the electrode terminal 113 may function as a positive electrode, and the can 111 and the cap plate 112 may function as a negative electrode.

The PCM 120 may measure a voltage of the battery cell 110, may prevent the battery cell 110 from being overcharged and over-discharged, based on a measured voltage value, and may protect the battery cell 110 against high temperatures. To do so, the PCM 120 may include a substrate 121, and a protection device 122 and a safety device 123 that are mounted on the substrate 121.

The PCM 120 may be disposed above the battery cell 110 and thus may be electrically connected to the battery cell 110. For example, the PCM 120 may be electrically connected to the electrode terminal 113, (e.g., a negative electrode of the battery cell 110), via the safety device 123 to be described below, and may be electrically connected to the cap plate 112, (e.g., a positive electrode of the battery cell 110), by the connection members 130. The connection members 130 may separate the PCM 120 from the cap plate 112 by a predetermined gap and thus there may be a space between a first surface of the PCM 120 and a top surface of the battery cell 110 in which the protection device 122 and the safety device 123 are disposed.

The substrate 121 may have a wiring pattern for delivering an electrical signal, the protection device 122 and the safety device 123 may be mounted on a first surface of the substrate 121, and exterior terminals 124 for supplying electric energy to an external electronic device, e.g., the mobile device 1 of FIG. 1, may be formed on a second surface of the substrate 121.

The protection device 122 is a primary device that may output a control signal to monitor over-charge and over-discharge in the battery cell 110 and to control a charging operation and a discharging operation in a case of over-charge and over-discharge. The protection device 122 may be electrically connected to the wiring pattern formed on the substrate 121, thereby controlling over-charge and over-discharge in the battery cell 110. The protection device 122 may be formed as an integration circuit (IC) and may be mounted on the first surface of the substrate 121.

Electromagnetic waves that are generated when the protection device 122 operates are shielded by a shielding layer or shielding patterns formed on the substrate 121 of the PCM 120. The shielding layer may shield the electromagnetic waves that are generated from the operation of the protection device 122, and thus, may prevent the electromagnetic waves from interfering with an operation of the antenna transceiving unit 21. A shielding function of the PCM 120 and a detailed structure therefor are described below with reference to FIGS. 4 and 5.

The safety device 123 is a secondary device that may prevent a flow of current when a secondary battery is overheated by a predetermined temperature. For example, with a high temperature, over-charge or over-discharge in the battery cell 110 occurs and the flow of current may be broken by the safety device 123. The safety device 123 may be disposed on the first surface of the substrate 121 and may be electrically connected to the electrode terminal 113 and the substrate 121. The safety device 123 may include one or more of a positive temperature coefficient (PTC), a fuse, a current breaking device, bi-metal, and the like.

The upper cover 140 may be combined with an upper portion of the battery cell 110 and may include the PCM 120. The upper cover 140 may be formed of a cover plate 141 and a sidewall 142 that downwardly extends from the cover plate 141. The lower cover 150 may be combined with a lower portion of the battery cell 110 and may include a bottom plate 151 and a sidewall 152 that upwardly extends from the bottom plate 151.

The label 160 may be attached around side surfaces of the battery cell 110. Here, the label 160 surrounds the side surfaces of the battery cell 110 while covering the sidewall 142 of the upper cover 140 and the sidewall 152 of the lower cover 150.

Figure 4:
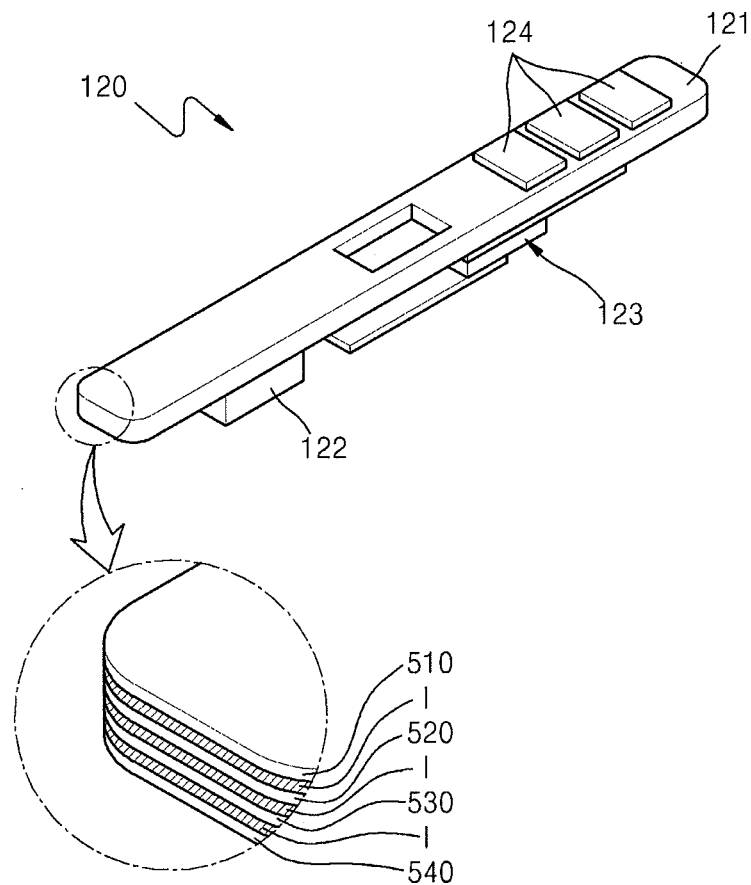
FIG. 4 is a perspective view of the PCM that is extracted from the battery pack, according to an embodiment of the present disclosure.
Figure 5:
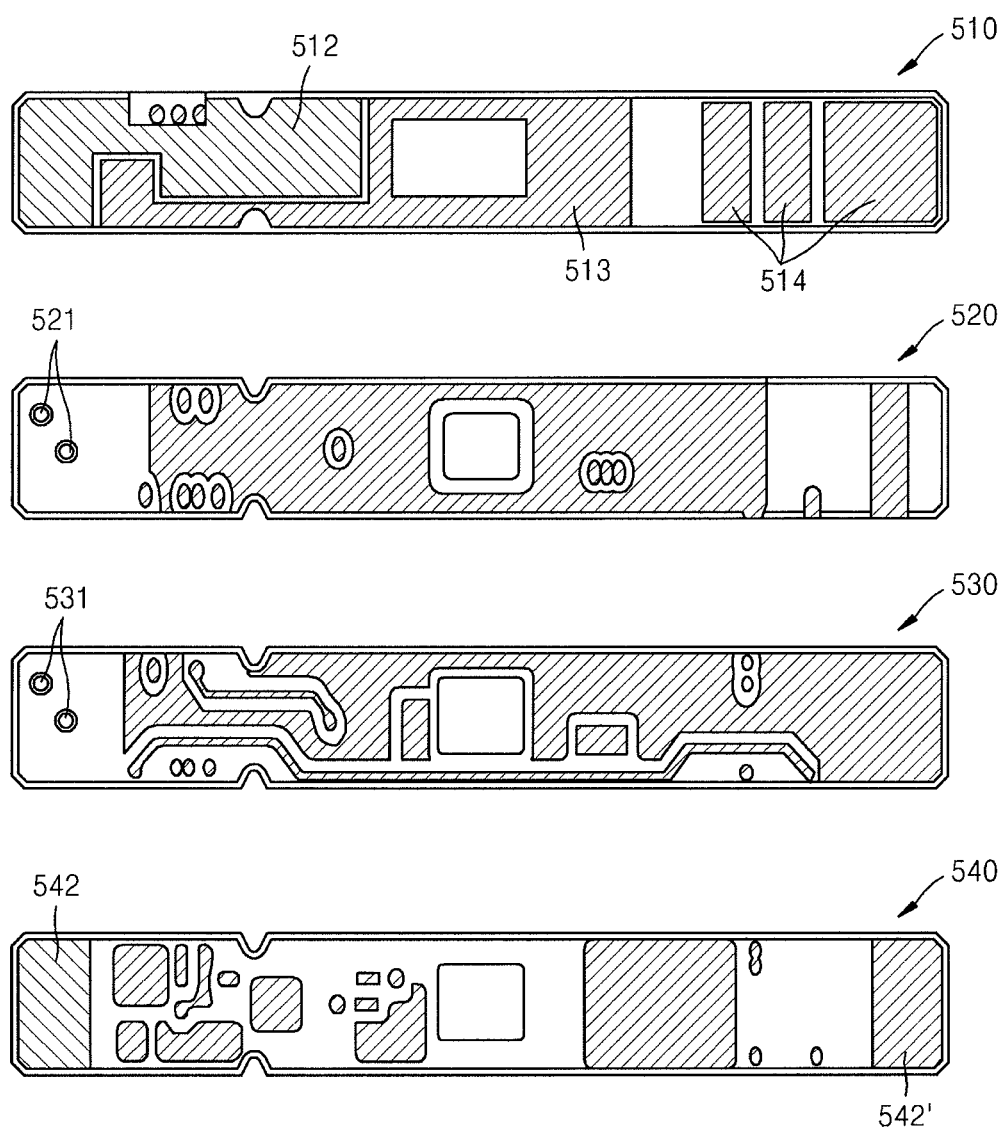
FIG. 5 illustrates bottom views of a plurality of circuit layers forming a substrate of the PCM of FIG. 4.

FIG. 4 is a perspective view of the PCM 120 extracted from the battery pack 10, according to an embodiment of the present disclosure, and FIG. 5 illustrates bottom views of a plurality of circuit layers 510, 520, 530, and 540 included in the substrate 121 of the PCM 120 of FIG. 4.

Referring to FIG. 4, the protection device 122 and the safety device 123 are mounted on the first surface of the substrate 121, which faces the top surface of the battery cell 110, and the exterior terminals 124 are formed on the second surface of the substrate 121. Here, the protection device 122 may be formed on one side of the first surface, and the safety device 123 may be formed on one the other side of the first surface.

Referring to a magnified portion of FIG. 4, the substrate 121 may include the circuit layers 510, 520, 530, and 540, and insulating layers (I) interposed therebetween. The circuit layers 510, 520, 530, and 540 formed in the substrate 121 may each include a circuit pattern (not shown), and the circuit layers 510, 520, 530, and 540 may be electrically connected to each other via an inner-via hole formed in each of the circuit layers 510, 520, 530, and 540. A shielding pattern 512 to shield electromagnetic waves generated in the protection device 122 is formed on at least one of the circuit layers 510, 520, 530, and 540.

Referring to FIG. 5, the circuit patterns are formed on the circuit layers 510, 520, 530, and 540, respectively. From among the circuit layers 510, 520, 530, and 540, the first circuit layer 510 is disposed in an upper portion of the substrate 121, the fourth circuit layer 540 is disposed in a lower portion of the substrate 121, and the second and third circuit layers 520 and 530 are between the first circuit layer 510 and the fourth circuit layer 540.

Referring to a rear surface of the first circuit layer 510 illustrated in FIG. 5, the shielding pattern 512 is formed in a region of the rear surface of the first circuit layer 510, which corresponds to a location where the protection device 122 is mounted. The shielding pattern 512 may include nickel. Alternatively, the shielding pattern 512 may include other metal materials such as copper. The shielding pattern 512 may be formed together with the circuit pattern by a process in which the circuit pattern is formed on the first circuit layer 510. For example, the shielding pattern 512 may be formed by a printing method.

An area of the shielding pattern 512 may be greater than an area of the protection device 122. For example, the shielding pattern 512 may be formed to cover a region of the rear surface corresponding to a region in which the protection device 122 is mounted, a connection pattern 542 to be described below, and via holes 521 and 531 formed in the second and third circuit layers 520 and 530, respectively.

A circuit pattern 513 that is electrically connected to the safety device 123 may be formed next to the shielding pattern 512, and terminal patterns 514 that are electrically connected to the exterior terminals 124, respectively, may be formed on an opposite side to the shielding pattern 512.

Although not illustrated, the exterior terminals 124 (refer to FIG. 4) may be disposed on a side of a front surface of the first circuit layer 510, and the front surface of the first circuit layer 510 may be coated with an insulating film (not shown), except for the exterior terminals 124.

Referring to a rear surface of the fourth circuit layer 540 illustrated in FIG. 5, a plurality of connection patterns (e.g., 542 and 542') that are connected to the connection members 130, respectively, are formed on the rear surface of the fourth circuit layer 540. The plurality of connection patterns may be formed on one or both side ends of the fourth circuit layer 540. For example, the connection patterns 542 and 542' may be formed on both side ends of the fourth circuit layer 540, respectively. The connection patterns 542 and 542' may be exposed to the outside of the substrate 121, and may be electrically connected to the cap plate 112 of the battery cell 110 via the connection members 130 described above with reference to FIG. 2. The connection pattern 542 that is from among the connection patterns 542 and 542' formed on both side ends of the fourth circuit layer 540 and that is adjacent to the shielding pattern 512 may function as a second shielding pattern. For example, the connection pattern 542 together with the shielding pattern 512 formed in the first circuit layer 510 may shield electromagnetic waves generated by the protection device 122.

Because the shielding pattern 512 and/or the connection pattern 542 are arranged on the circuit layers 510, 520, 530, and 540 of the substrate 121 to shield the electromagnetic waves generated by the protection device 122, a separate process for shielding is not necessary and space utilization is improved.

The shielding pattern 512 formed on the first circuit layer 510, and the connection pattern 542 formed on the fourth circuit layer 540 may be electrically connected through the via holes 521 and 531 formed in the second and third circuit layers 520 and 530, respectively, that are interposed between the first circuit layer 510 and the fourth circuit layer 540. The shielding pattern 512, the connection pattern 542, and the via holes 521 and 531 therebetween form a current path.

Since the shielding pattern 512 is formed with a large area, a resistance of the current path is decreased, so that a flow of current moving in the current path becomes smooth. That is, the flow of current moving in the substrate 121, i.e., in the PCM 120, is smooth, so that an operation efficiency of the PCM 120 is improved. Also, an effect by the battery pack 10 that affects the antenna transceiving unit 21 is minimized.

As described above, the number of circuit layers included in the substrate 121 is four. However, in alternative embodiments, the number of circuit layers included in the substrate 121 may different. The substrate 121 may include at least one circuit layer.

Figure 6:
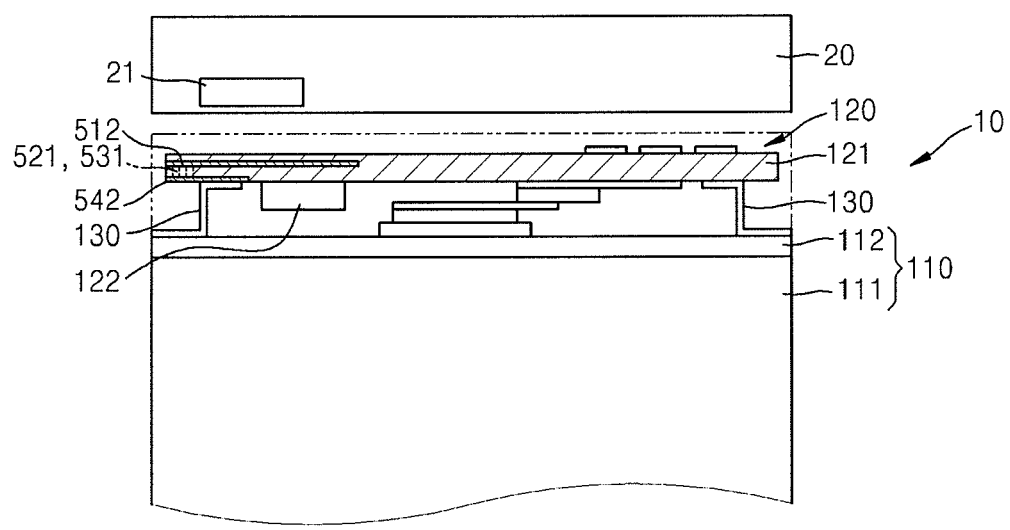
FIG. 6 is a cross-sectional side view schematically illustrating a disposition state between the battery pack and an antenna transceiving unit, when the battery pack supplies power to a mobile device.

FIG. 6 is a cross-sectional side view schematically illustrating a disposition state between the battery pack 10 and the antenna transceiving unit 21, when the battery pack 10 supplies power to a mobile device. For convenience of description, the substrate 121 includes only the shielding pattern 512 and the connection pattern 542 formed on the first circuit layer 510 and the fourth circuit layer 540, respectively, of the circuit layers 510, 520, 530, and 540 of the substrate 121, which are described above with reference to FIGS. 4 and 5.

Referring to FIG. 6, the protection device 122 is mounted on the first surface of the PCM 120 disposed above the battery cell 110, and the shielding pattern 512 and the connection pattern 542 are formed around the protection device 122. However, in alternative embodiments, the placement of the protection device 122 may be varied, with the placement of the shielding pattern 512 and the connection pattern correspondingly varied so as to remain formed around the protection device 122.

As described above with reference to FIGS. 4 and 5, the shielding pattern 512 has a sufficient area sufficient that covers the protection device 122, and the connection pattern 542 functions as a secondary shielding pattern that prevents electromagnetic waves generated by the protection device 122 from being emitted to the antenna transceiving unit 21.

Also, a current path is formed where the connection pattern 542 that is electrically connected to the battery cell 110 via the connection members 130 is electrically connected to the shielding pattern 512 via the via holes 521 and 531, and by forming the current path having a large area, a resistance is decreased so that an effect by the battery pack 10 that affects the antenna transceiving unit 21 may be minimized.

According to the aforementioned structure, performance deterioration of the antenna transceiving unit 21 may be prevented, so that the battery pack 10 may be included in the mobile device 1 without limitations to a location of the protection device 122.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A battery pack, comprising:
   a battery cell; and
   a protection circuit module (PCM) in electrical communication with the battery cell, the PCM comprising a plurality of conductive circuit layers that each include respective circuit patterns, wherein at least one of the conductive circuit patterns is a shielding pattern that shields at least a portion of electromagnetic waves generated by the protection circuit module wherein the PCM further comprises:
   a substrate including the plurality of circuit layers; and
   a protection device mounted to the substrate that outputs a control signal to monitor charging of the battery cell and controls charging and discharging of the battery cell;
   wherein the shielding pattern is positioned within the substrate and is dimensioned to overlie the protection device and thereby shields at least a portion of electromagnetic waves generated by operation of the protection device from being emitted outside of the battery pack.

2. The battery pack of claim 1, wherein the shielding pattern is positioned between the protection device and an outer surface of the battery pack.

3. The battery pack of claim 1, further comprising a first circuit layer including a first shielding pattern, wherein at least a portion of the first shielding pattern overlaps the protection device in a direction out of the plane of the first circuit layers.

4. The battery pack of claim 3, wherein the first shielding pattern extends over an area greater than a lateral dimension of a portion of the protection device that generates the electromagnetic waves.

5. The battery pack of claim 3, further comprising a second circuit layer including a plurality of second shielding patterns, wherein at least one of the first and second shielding patterns overlap in a direction out of the planes of the first and second circuit layers.

6. The battery pack of claim 5, wherein the plurality of second shielding patterns comprises two second shielding patterns, each second shielding pattern positioned at a respective end of the second circuit layer.

7. The battery pack of claim 5, wherein the first and at least one of the second shielding patterns are positioned adjacent to the protection device.

8. The battery pack of claim 5, wherein the first and second shielding patterns are electrically connected.

9. The battery pack of claim 5, further comprising third and fourth circuit layers interposed between the first and second circuit layers, wherein a hole is formed in each of the third and fourth circuit layers and wherein the first and second circuit layers are electrically connected by a current path formed by the first shielding pattern, the holes in the third and fourth circuit layers, and the plurality of second shielding patterns.

10. The battery pack of claim 9, wherein the first shielding pattern extends over at least an area corresponding to position of the protection device, one of the second shielding patterns, and the holes in the third and fourth layers.

11. The battery pack of claim 5, wherein the plurality of second shielding patterns is exposed outside of the substrate.

12. The battery pack of claim 1, further comprising a safety device mounted to the substrate, wherein at least one of the protection circuit device and the safety device are positioned between the protection circuit module and the battery cell.

13. The battery pack of claim 5, wherein the protection circuit module is positioned adjacent to a cap plate sealing the battery cell.

14. The battery pack of claim 13, further comprising a plurality of connection members interposed between the protection circuit module and the battery cell, wherein the second shielding patterns are electrically connected to the cap plate by the connection members.

15. A electronic device, comprising:
  a battery pack that supplies electrical power to the electronic device; and
  a transceiver;
  wherein the battery pack includes a plurality of conductive circuit layers that each include respective circuit patterns, wherein at least one of the conductive circuit patterns is a shielding pattern that shields at least a portion of electromagnetic waves generated by the battery cell from the transceiver;
  a protection circuit module (PCM that generates electromagnetic waves in operation wherein the PCM further comprises:
  a substrate including the plurality of circuit layers; and
  a protection device mounted to the substrate that outputs a control signal to monitor charging of the battery cell and controls charging and discharging of the battery cell;
  wherein the shielding pattern is positioned within the substrate and is dimensioned so as to overlie the protection device and thereby shields at least a portion of electromagnetic waves generated by operation of the protection device from being emitted outside of the battery pack.

16. The electronic device of claim 15, further comprising a first circuit layer and a plurality of second shielding patterns, wherein the first and second shielding patterns overlap in a direction out of the plane of the first and second shielding patterns.

17. The electronic device of claim 15, further comprising a first circuit layer and a second circuit layer, wherein the plurality of second shielding patterns comprises at least two shielding patterns positioned at respective ends of the second circuit layer.

* * * * *